United States Patent [19]
Kelly

[11] Patent Number: 4,625,082
[45] Date of Patent: Nov. 25, 1986

[54] LOCAL AREA NETWORK COMMUNICATIONS SYSTEM FOR MAINTAINING SERVICE IN THE EVENT OF A FAULT

[75] Inventor: Michael B. Kelly, St. Albans, England

[73] Assignee: Standard Telephones & Cables Public Limited Co., London, England

[21] Appl. No.: 617,280

[22] Filed: Jun. 4, 1984

[30] Foreign Application Priority Data

Jul. 15, 1983 [GB] United Kingdom ................. 8319223

[51] Int. Cl.⁴ ......................... H04B 3/46; H04M 3/12
[52] U.S. Cl. ..................................... 379/273; 370/16; 371/9; 379/279
[58] Field of Search ...................... 179/18 EE, 175.35; 370/16, 88; 364/131; 371/9, 10

[56] References Cited

U.S. PATENT DOCUMENTS

| | | | |
|---|---|---|---|
| 3,569,632 | 3/1971 | Beresin et al. | 370/16 |
| 3,876,983 | 4/1975 | Zafiropulo et al. | 179/175.3 S X |
| 3,983,340 | 9/1976 | Lima et al. | 179/175.3 S |
| 4,042,780 | 8/1977 | Wolters | 179/18 EE X |
| 4,232,206 | 11/1980 | Tooyama | 179/175.3 S |
| 4,356,563 | 10/1982 | Viale | 370/58 |
| 4,360,912 | 11/1982 | Metz et al. | 370/96 |
| 4,464,658 | 8/1984 | Thelen | 340/825.5 |
| 4,506,357 | 3/1985 | Nakayashiki et al. | 370/16 |
| 4,527,235 | 7/1985 | Chebra | 364/200 |

OTHER PUBLICATIONS

"The Enhancement of the SP-1 Electronic Switch", C. Chiu et al., *Telesis* (Canada), Jun. 1979, pp. 16-22.

*Primary Examiner*—Thomas W. Brown
*Attorney, Agent, or Firm*—Kerkam, Stowell, Kondracki & Clarke

[57] ABSTRACT

In a telecommunication system with a number of units (Ula-Una, Ulb-Unb) for control purposes and also for subscriber facilities, each such unit is duplicated, as is the system controller (SCa, Scb). There are two local area networks (1,3), each of which interconnects one system controller and one unit of each pair of units. When one network is to be isolated, e.g. for servicing or when a fault occurs, its controller detects that condition, and isolates that network by relay circuitry in the termination (T2, T3) of the bus. Another version of the system uses local area networks of the closed ring type. In certain cases the units, etc., may be triplicated.

4 Claims, 2 Drawing Figures

LOCAL AREA NETWORK COMMUNICATIONS SYSTEM FOR MAINTAINING SERVICE IN THE EVENT OF A FAULT

BACKGROUND OF THE INVENTION

This invention relates to communication systems, in which sections of a bus-type local area network are so arranged that when a fault occurs, the faulty part of the system can be isolated while service is maintained for the rest of the system.

SUMMARY OF THE INVENTION

According to the present invention, there is provided a communications system including a number of units, each of which is duplicated in the interests of system security such that for each such unit there is a first and a second unit, with each of the first units corresponding to a respective different one of the second units. There is also included a system controller, also duplicated in the interests of system security such that there is a first system controller associated with the first units and a second system controller associated with the second units. A local area network (LAN) interconnects the units and the system controller, the LAN including a first LAN section which interconnects the first system controller and all of the first units and a second LAN section which interconnects the second system controller and all of said second units. A link is connected between the first system controller and the second system controller so that information as to operation effected by either one of said system controllers can be signalled to the other of said system controllers. Finally, there are included first and second switching means associated respectively with the first and the second LAN sections and under the control respectively of the first and the second system controllers such that, if a LAN section is found by its system controller to be disturbed, the switching means for the disturbed LAN section operates to isolate the disturbed LAN section and to enable the other LAN section to maintain service to the units via the switching means of the othr LAN section.

One application of an arrangement such as just mentioned is to the interconnection of control units of a telephone exchange in which control is at least partly distributed. One example of such an exchange is the now well-known TXE4 exchange, in which case the units to be interconnected include existing control units of the exchange, and further control units for the provision of subscriber facilities. Hence the present arrangement is especially useful where it is desired to enhance an existing exchange by the provision of facilities not normally available to subscribers served by that exchange.

BRIEF DESCRIPTION OF THE DRAWINGS

Embodiments of the invention will now be described with reference to the accompanying drawing, in which.

DETAILED DESCRIPTION

It will be appreciated that where, as in a public telephone exchange, high reliability is essential, a single network interconnecting the units may not give adequate system security. In the arrangement described herein, a single local area network is divided into two sections, and each part of the network is associated with one part of each duplicated security unit of the system. To restore full interconnection of all security units, i.e. between all their ports, an interconnection unit using simple relays can provide for the two network sections to normally operate as one local area network, but can allow a section to be isolated and terminated correctly should the other section fail.

Note that in some cases more than two sections may be provided, in which case there are more than two of each unit. In general it is unlikely that the extra cost of providing more than three of each unit will be justified by the higher degree of security thus provided.

Figure 1:
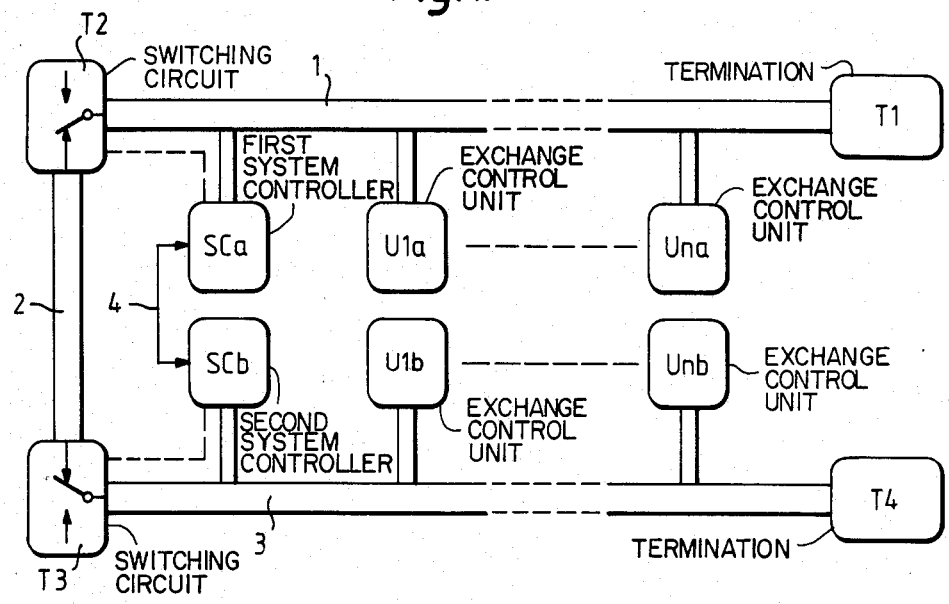
FIG. 1 shows schematically a system of the bus type embodying the invention and FIG. 2 shows schematically a system of the ring type.

In a system using a duplicated unit structure for security, a natural solution to the need for a reliable interconnection structure using a local area network (LAN) is to duplicate the LAN and allow each security half of each unit access to both LANs. This allows for failure of a LAN, intrinsically unlikely but possible through human error or due to unavoidable maintenance or interference on a LAN, while maintaining full interconnection of all units and cross-coupling between all security halves of all units. However, this solution is expensive because of the high cost of LAN interface equipment. Hence a preferred solution to the problem, a system such as that of FIG. 1 is used. Here we preserve the interconnection advantages of a simple LAN with the capability for isolation under fault afforded by two LANs.

In FIG. 1, the LAN cables 1, 2, 3 interconnect units T1-T4, of which T1 and T4 are terminations (usually resistive, see below). The units T2 and T3 include relay switching circuitry which gives access to similar terminations. There are n interconnected units, each duplicated, i.e. U1a to Unb and U1b to Unb, the a halves being connected to cable 1 and the b halves being connected to cable 3. The system controller is also duplicated, with SCa and SCb connected respectively to cables 1 and 3. The two controllers are interconnected by a data link 4 so that they can keep each other informed of the state of the network.

If a system controller, e.g. SCa detects a fault it exercises control on the relay circuitry of termination T2 to disconnect cable 1 and the equipments connected to it, in which case only cable 3 and its associated equipment functions. This control is exercised via the dashed line connections. In the present system, when one LAN section is found to be faulty it ceases to operate. The two controllers SCa, SCb are interconnected by the data link 4 solely for co-ordination between these links. However, in a system with fully duplicated security, the link 4 enables continuity to be maintained between SCa and SCb by data transfer over the link 4, so that each of the controllers can report its condition to the other controller.

Figure 2:
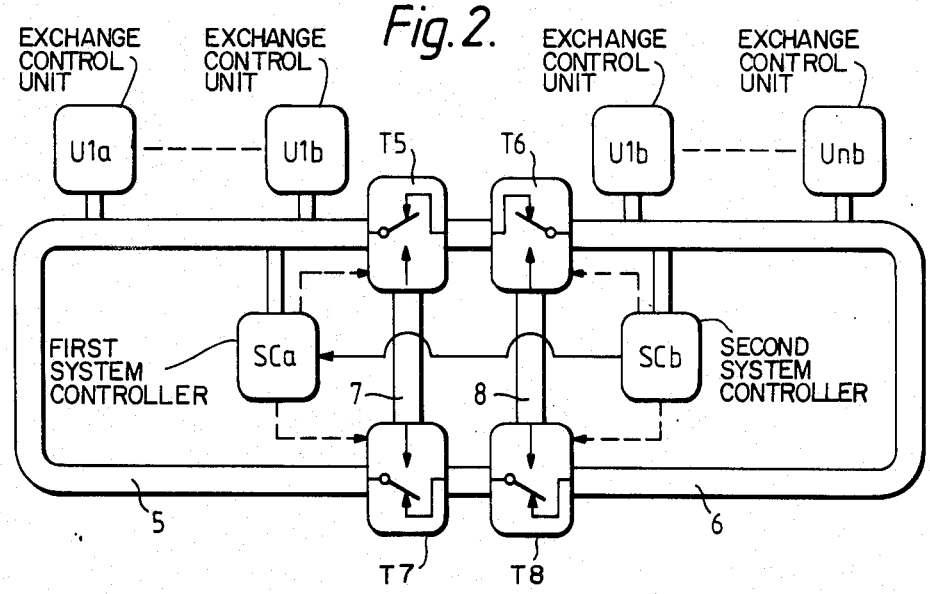

Thus FIG. 1 shows how the invention is directly applicable to bus-type LANs, such as a system of the Ethernet type. A simple variant of this approach can be used with ring-type LANs, such as one of the Cambridge Ring type, see FIG. 2. Here again the units and the system controller are duplicated, as shown, and connected to two ring-type cables 5, 6, with four switching units T5-T8 and further cables 7 and 8. Normally, the two LANs are interconnected as shown but each LAN section (5 or 6) can be independently isolated, if necessary. As shown, each LAN section is isolated independently by the system controller security half associated with that section.

This follows naturally from the duplicated structure shown, but it would be straightforward to provide for a single interconnection relay unit, under control of a single, centralised system controller which could isolate and terminate each LAN section in one operation. This scheme halves the number of LAN interfaces required in the system (since each security half of each unit now connects to only one LAN section) and adds only the small cost of the relay units. The control can be a simple power line to operate or release the relays. A data link is provided between the system controller security halves in the system illustrated, to allow for communication between them when the LAN sections are separated.

Note that only bus-type LANs need to be terminated, usually by a resistance of 50 ohms between the signal wire and ground. Thus FIG. 1 shows the relays switching the LAN sections to a termination connection in each case to the back contact of the change-over shown, to maintain operation. With ring-type LANs the required operation is a change-over switch between the complete outer ring (i.e. establishing all units on the same LAN and the two separate rings (sides a and b, respectively). In this application no terminations are needed since the LAN sections are always connected in a ring.

A further extension of the arrangements described in the use of more than two LAN sections and relays allowing the isolation of individual LAN sections while maintaining interconnection of the remaining section.

I claim:

1. A communications system, comprising:
    a number of served units, each of which is duplicated in the interests of system security such that for each such unit there is a first and a second unit, each said first unit corresponding to a respective different one of the second units;
    a system controller also duplicated in the interests of system security such that there is a first system controller associated with said first units and a second system controller associated with said second units;
    a local area network (LAN) interconnecting said units and said system controllers, said LAN including a first LAN section which interconnects said first system controller and all of said first units and a second LAN section which interconnects said second system controller and all of said second units;
    a link connected between the first system controller and the second system controller so that information as to operation effected by either one of said system controllers can be signalled to the other of said system controllers; and
    first and second switching means associated respectively with the first and the second LAN sections and under the control respectively of the first and the second system controllers such that, if a LAN section is found by its system controller to be disturbed, the switching means for said disturbed LAN section operates to isolate the disturbed LAN section and to enable the other LAN section to maintain service to said units via the switching means of the other LAN section.

2. A system as claimed in claim 1, in which each LAN section is of a two-ended bus type with a respective termination at one of its said ends, in which each LAN section is connected to its respective switching means at its other end, each switching means also forming a termination for the said LAN section, and in which said two switching means are coupled.

3. A system as claimed in claim 1, in which each LAN section is of the loop type, in which each switching means includes two switch units so that the first LAN section interconnects the two switch units for its corresponding LAN, and in which each system controller controls the two switch units of its associated switching means.

4. An automatic telephone exchange comprising:
    a switching network and a number of functional control units which together constitute a control network which is at least partly distributed;
    a communication system which interconnects said functional control units;
    said functional control units being duplicated in the interests of a system security so that for each such unit there is a first functional control unit and a second functional control unit, each said first unit corresponding to a different one of the second units; and
    said communication system including;
        a system controller also duplicated in the interests of system security such that there is a first system controller associated with said first functional control units and a second system controller associated with said second functional control units,
        a local area network (LAN) interconnecting said functional control units and said system controllers, said LAN including a first LAN section which interconnects said first system controller and all of said first functional control units and a second LAN section which interconnects said second system controller and all of said second functional control units,
        a link connected between the first system controller and the second system controller so that information as to operations effected by either one of said system controllers can be signalled to the other of said system controllers, and
        first and second switching means associated respectively with the first and the second LAN sections and under the control respectively of the first and the second system controllers such that, if a LAN section is found by its system controller to be disturbed, the switching means for said disturbed LAN section operates to isolate the disturbed LAN section and to enable the other LAN section to maintain service to said units via the switching means of the other LAN section so that the telephone exchange continues to operate under the control of the functional control units associated with said other LAN section.

* * * * *